Dec. 14, 1948.  F. M. CLARK  2,456,381
ELECTRIC CAPACITOR
Filed July 29, 1944
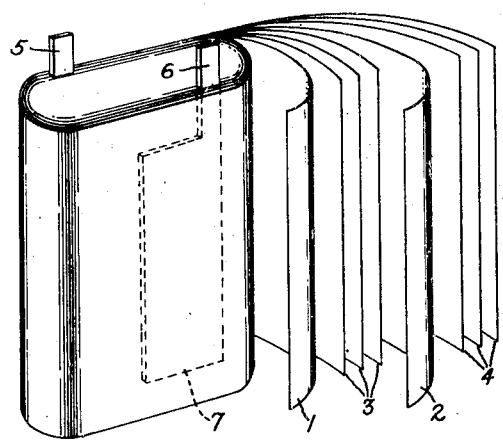
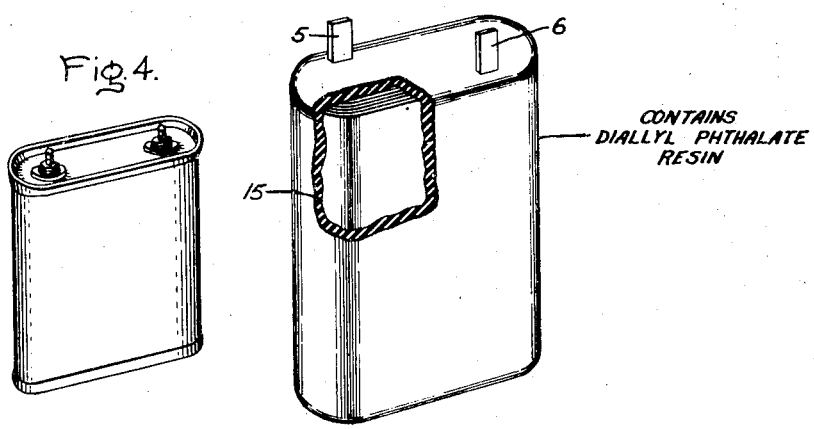
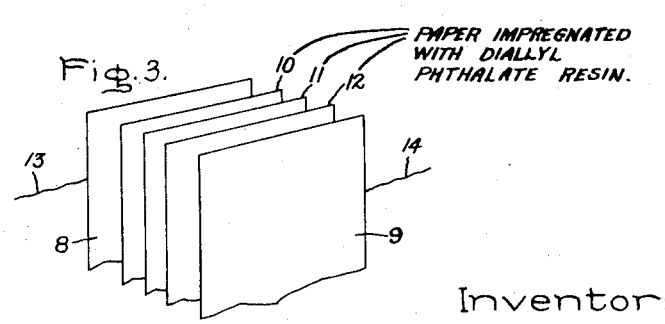
Inventor:
Frank M. Clark,
by Harry E. Dunham
His Attorney.

Patented Dec. 14, 1948

2,456,381

UNITED STATES PATENT OFFICE

2,456,381

ELECTRIC CAPACITOR

Frank M. Clark, Pittsfield, Mass., assignor to General Electric Company, a corporation of New York Application July 29, 1944, Serial No. 547,128

2 Claims. (Cl. 175—41)

The present invention relates in general to electric capacitance devices, and its object is to provide capacitance devices of high efficiency in which the dielectric element consists of solid resinous material.

Heretofore, electric capacitors in which the dielectric elements comprised resinous material have been found to be impracticable because of their high power factors. When the capacitors were impregnated with a resin in solution, other difficulties arose as the elimination of the solvent left voids in the capacitors. Voids result in low electric breakdown and short life. Also, due to the relatively low dielectric constants of such resins which heretofore were tried as capacitor dielectric elements, poor efficiencies were obtained. These poor results led to the widespread belief that resins could not be successfully used as dielectric elements in electric capacitors.

Liquid dielectric materials, on the other hand, have been used with notable success for capacitor impregnation. In particular, mineral oil and liquid chlorinated diphenyl have been widely used. In some fields in which capacitors are utilized, liquid dielectric materials are not desired or practicable.

In accordance with my present invention, I have provided capacitors of superior characteristics which embody a resinous dielectric material. My invention is based on the discovery that resinified diallyl phthalate has dielectric properties well suited for capacitor dielectric purposes, especially for direct current circuits, also for 60 cycle circuits and, in general, for commercial low frequency circuits. As will hereinafter appear in detail, the characteristics of capacitors embodying my invention in several respects are unusually well adapted for environments in which the operating conditions, in particular a high temperature, are adverse for other types of dielectric materials. Capacitors embodying my invention are capable of successful operation at elevated temperatures for many times the normal life of capacitors of comparable efficiency.

In the accompanying drawing, Fig. 1 shows in perspective, and partly uncoiled, a capacitor assembly for impregnation; Fig. 2 shows a completed capacitor, the encasing resin layer being in part broken away; Fig. 3 shows diagrammatically a stacked form of capacitor; and Fig. 4 shows externally a capacitor encased in a metal container.

In the preparation of capacitors embodying my present invention the following procedure may be carried out. A capacitor assembly, such as shown in Fig. 1, may be made in the usual maner, as by winding strips of metal foil, for example aluminum or copper foil 1, 2, and interleaved layers 3 and 4 of paper to form a coil in which the foil armatures are closely spaced and separated substantially only by the paper. Electrical contact with the armatures may be made by laid-in tap straps 5, 6 or by folding over the end of the armature foil, or other suitable means. In order to avoid imperfect contact between the tap strap and the armatures, the tap strap may be welded to the armature. When unattached, it may be provided with a broad-surfaced terminal which makes contact with the armature foil as indicated at 7 in the drawing. Aluminum foil is suitable as a tap strap material. Although considerable latitude is permissible in the choice of paper, I prefer to employ linen or kraft capacitor paper having a thickness not greater than about .0005 inch. For capacitors to be used at voltages up to 600 volts on alternating or direct current circuits, I prefer to employ as spacer for the armatures two or three sheets of .0003 inch or .0004 inch kraft capacitor tissue. For circuits of higher voltage, a greater number of paper layers preferably are employed. It is not essential that the capacitor assembly should be coiled. In some instances it may be preferable to stack armatures 8, 9 and dielectric papers 10, 11, 12 upon one another as indicated in Fig. 3 of the drawing. Terminals 13, 14 are merely indicated as they are of conventional construction.

The windings or stacks of capacitor elements when assembled are vacuum-dried at a temperature of 100° to 115° C. in accordance with known technique. The assemblies then are impregnated in suitable molds (not shown) with diallyl phthalate monomer, that is, with the phthalate in a liquid, unpolymerized state. No solvent is required. In some cases it is desirable to locate the assembly in a metal mold, and in other cases in a mold of insulating material such as cardboard. The liquid diallyl phthalate is cast about the assembly. The capacitor assemblies preferably are completely surrounded by liquid diallyl phthalate so that when the diallyl phthalate is cured by heat treatment, solid resin blocks will be formed in which the capacitor assemblies are embedded, except of course for the projecting terminal conductors. Such a resin-enveloped capacitor is shown in Fig. 2, the resin shell 15 being partly broken away.

Preferably the uncured diallyl phthalate is associated with about three per cent of benzoyl peroxide, which is a catalyst for the polymerization step which occurs when the allyl ester is subjected to heat treatment.

After impregnation, the diallyl phthalate surrounding the capacitor assemblies is polymerized to the infusible, insoluble state by a suitable heat treatment. The containers and contents first are heated for five hours at 55° C. to effect a preliminary polymerization. The heat treatment then is interrupted and the filling holes in the container are closed, as by soldering if a metal container is employed as shown in Fig. 4.

The resin-encased assembly then is further heated for about 65 hours at 55° C., then for about 16 hours at 80° C., and finally for about 24 hours at 115° C.

The dielectric constant of the polymerized resin is in the range of about 4.5 to 5. Capacitor assemblies impregnated with resinified diallyl phthalate have a capacity per unit area which is substantially equal to the capacity of similar capacitor assemblies which are impregnated with pentachlor diphenyl. The power factor (a measure of energy loss) characterizing the operation of the resinified diallyl phthalate capacitors, is low and closely approximates the power factor of capacitors impregnated with chlorinated diphenyl. The resistance characterizing the capacitors impregnated with the resinified diallyl phthalate is very much higher and, hence, greatly superior to the resistance characterizing the chlor diphenyl impregnant. At 25° C., the resistance of capacitors rated at 600 volts direct current and impregnated with resinified diallyl phthalate expressed in megohm microfarads is about 7500 and of capacitors impregnated with chlorinated diphenyl about 2700. The insulation resistance commonly expressed as megohm-microfarads is obtained by multiplying the resistivity in megohms with the capacity in microfarads.

At ambient temperatures approximating 100° C., electric capacitors embodying my present invention possess extraordinary stability. At an ambient temperature of 85 to 90° C. their life is so long that life tests under observation cannot be conveniently made.

Life tests have been made at higher (and hence more severe) ambient temperatures. Groups of capacitors comprising aluminum foil armatures separated by three sheets of .0003 inch kraft capacitor paper and containing, respectively, chlorinated diphenyl, mineral oil and diallyl phthalate resin were tested at a temperature of 110° C., the impressed voltage being 1000 volts.

The chlorinated diphenyl comparison group of capacitors included both unmodified chlorinated diphenyl and chlorinated diphenyl containing a heat stabilizer consisting of chlorinated anthraquinone.

The capacitors containing unmodified chlorinated diphenyl had average lives of only about 50 hours under these severe conditions. The capacitors containing heat-stabilized chlorinated diphenyl had average lives of about 150 hours. The mineral oil-treated capacitors had average lives of about 160 hours. The capacitors embodying the present invention have extraordinarily long life—greater than 1500 hours—under these conditions. The characteristic or average life is at least 2000 hours.

A common life test condition for capacitors which are intended to operate in 600 volt, direct current circuits, is that they should survive 250 hours when operated at 1000 volts direct current under an ambient temperature of 85° C. In other words, the test is considered successful if no failures are obtained in less than 250 hours of operation. When subjected to such a test at 1000 volts direct current, at a temperature of 110° C., which is much more severe than the temperature of 85° C., it is found that capacitors made in accordance with the present invention show no electrical deterioration what ever within the 250 hour period and, indeed, show an improvement in many cases in insulation resistance.

In such a test at 25° C. the insulation resistance after 278 hours of operation at 110° C. had increased from 7500 to 7800 megohm-microfarads.

Similarly, on alternating current circuits, capacitors embodying the present invention show no deterioration and, indeed, show an improvement when operated at 100° C. at double the normal voltage.

The excellent dielectric properties of capacitors embodying the present invention are indicated by their extraordinary ability to retain an electrical charge upon prolonged standing. It has been found that diallyl phthalate-impregnated capacitors, after once having been placed under voltage, will retain an electric charge for several weeks. Such capacitors, being free from all hazard of the leakage of liquid impregnant, are well adapted for fluorescent lamp outfits, motor starting and running circuits, and direct current radio appliances. Because of their light weight, especially when enclosed in paper containers, and high capacity per unit volume, they are well suited for photoflash equipment. Their capability of retaining an electric charge is of especial importance in photoflash equipments in which the desired result is dependent upon the magnitude of the capacitor discharge current.

What I claim as new and desire to secure by Letters Patent of the United States is:

1. An electric capacitor adapted for operation at a high temperature of the order of 100° C., comprising the combination of cooperating metal armatures, an interposed absorbent spacer and solid, resinified diallyl phthalate permeating said spacer, said capacitor having an average life in excess of 1500 hours when operated at approximately 1000 volts D. C. per mil of dielectric and at ambient temperatures approximating 100° C.

2. An electric capacitor adapted for operation at a high temperature of the order of 100° C., consisting of strips of metal foil, an interposed spacer of paper strips, said foil and paper being coiled in the form of a roll, and solid diallyl phthalate resin in the insoluble, infusible state permeating and enveloping said roll, said capacitor having an average life of at least 2000 hours when operated at approximately 1000 volts D. C. per mil of dielectric and at ambient temperatures approximating 100° C.

FRANK M. CLARK.

REFERENCES CITED

The following references are of record in the file of this patent:

UNITED STATES PATENTS

| Number | Name | Date |
|---|---|---|
| 1,895,376 | Clark | Jan. 24, 1933 |
| 1,966,163 | Clark | July 10, 1934 |
| 2,203,283 | Miller | June 4, 1940 |
| 2,238,030 | Bradley | Apr. 15, 1941 |
| 2,266,812 | Ruben | Dec. 23, 1941 |

FOREIGN PATENTS

| Number | Country | Date |
|---|---|---|
| 467,608 | Great Britain | June 21, 1937 |

OTHER REFERENCES

"Synthetic Resins and Their Raw Materials," report #131, second series, page 30. Published by the U. S. Government Printing Office 1938. (Copy in Div. 48. Copy in Scientific Library of the Patent Office TP978U58.)